June 17, 1969
J. KLEIMAN
3,449,960
CORRECTABLE REFERENCES IN GYROS
Filed Feb. 3, 1966
Sheet 1 of 5
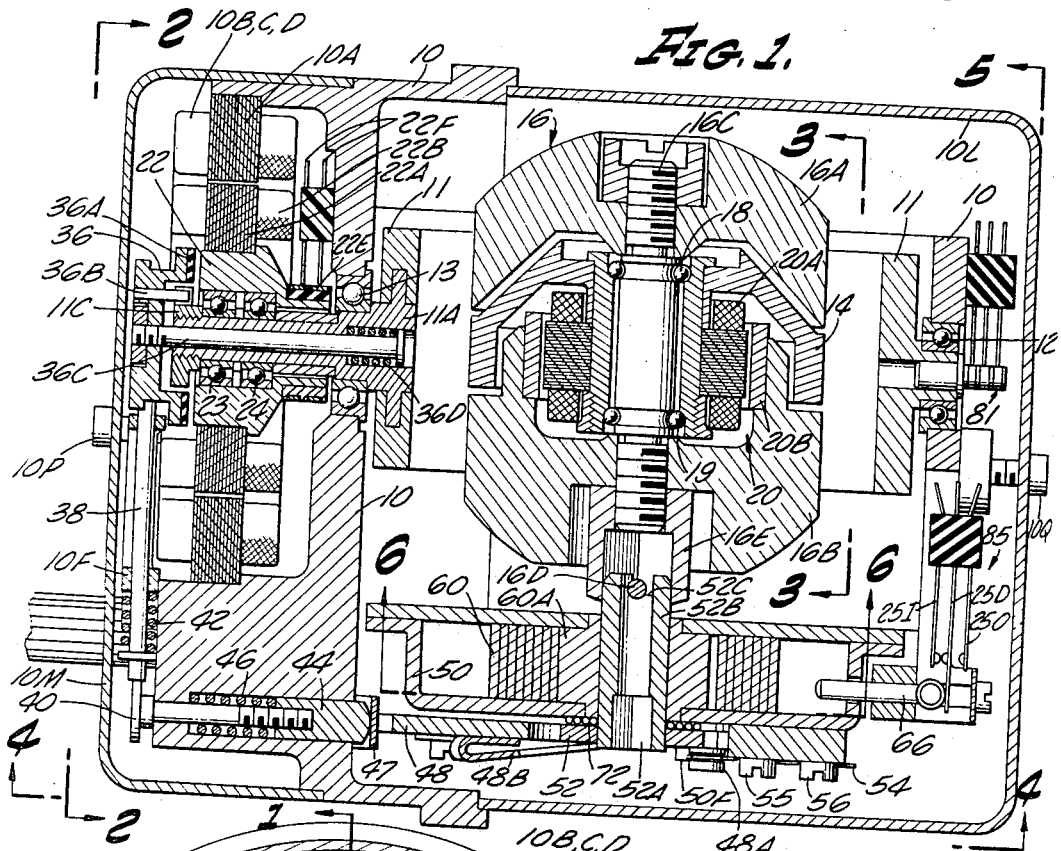
FIG. 1.
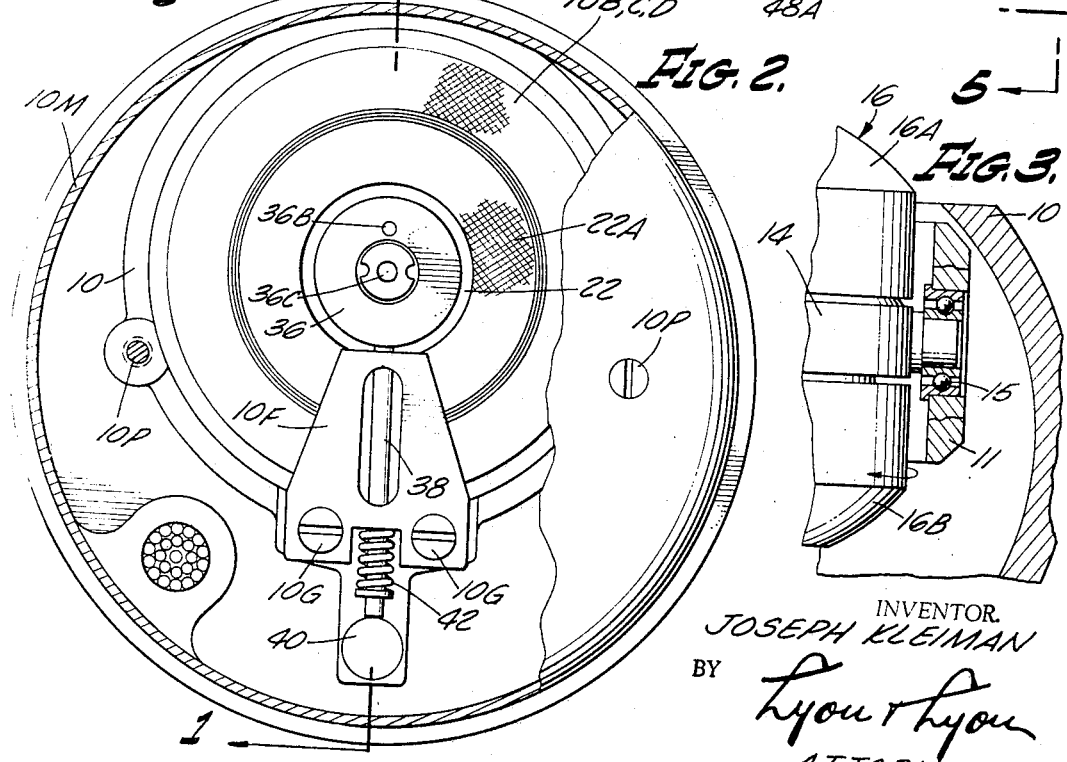
FIG. 2.
FIG. 3.
INVENTOR.
JOSEPH KLEIMAN
BY Lyon & Lyon
ATTORNEYS

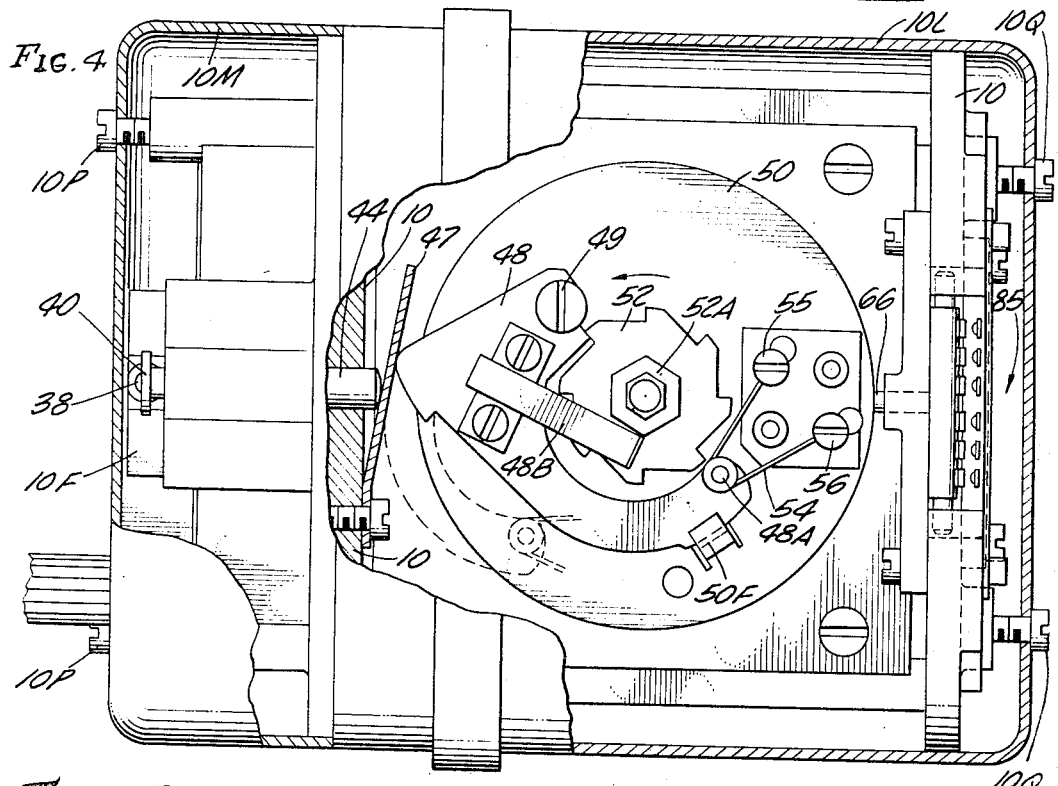
Fig. 4
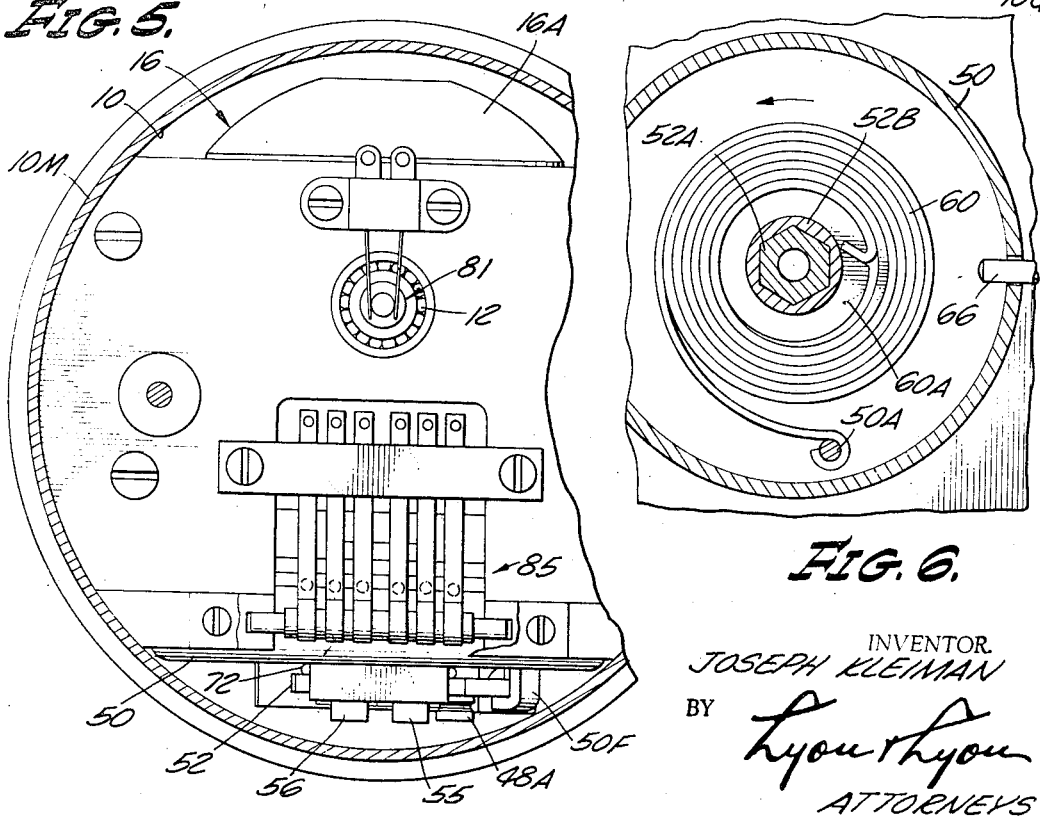
Fig. 5.
Fig. 6.
INVENTOR.
JOSEPH KLEIMAN
BY Lyon & Lyon
ATTORNEYS

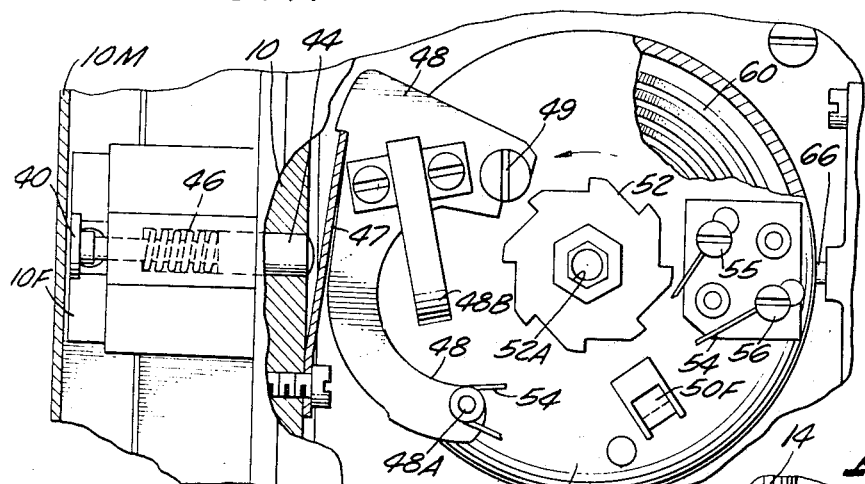
FIG. 7.
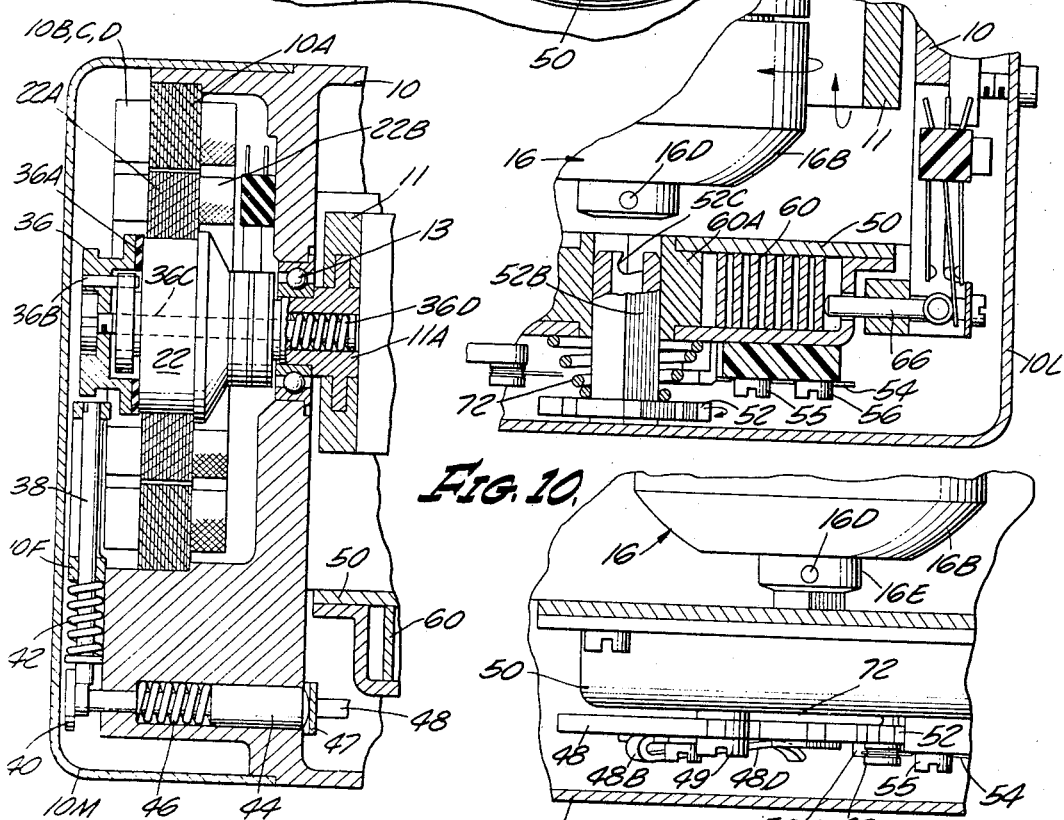
FIG. 8.
FIG. 9.
FIG. 10.
INVENTOR.
JOSEPH KLEIMAN
BY Lyon & Lyon
ATTORNEYS

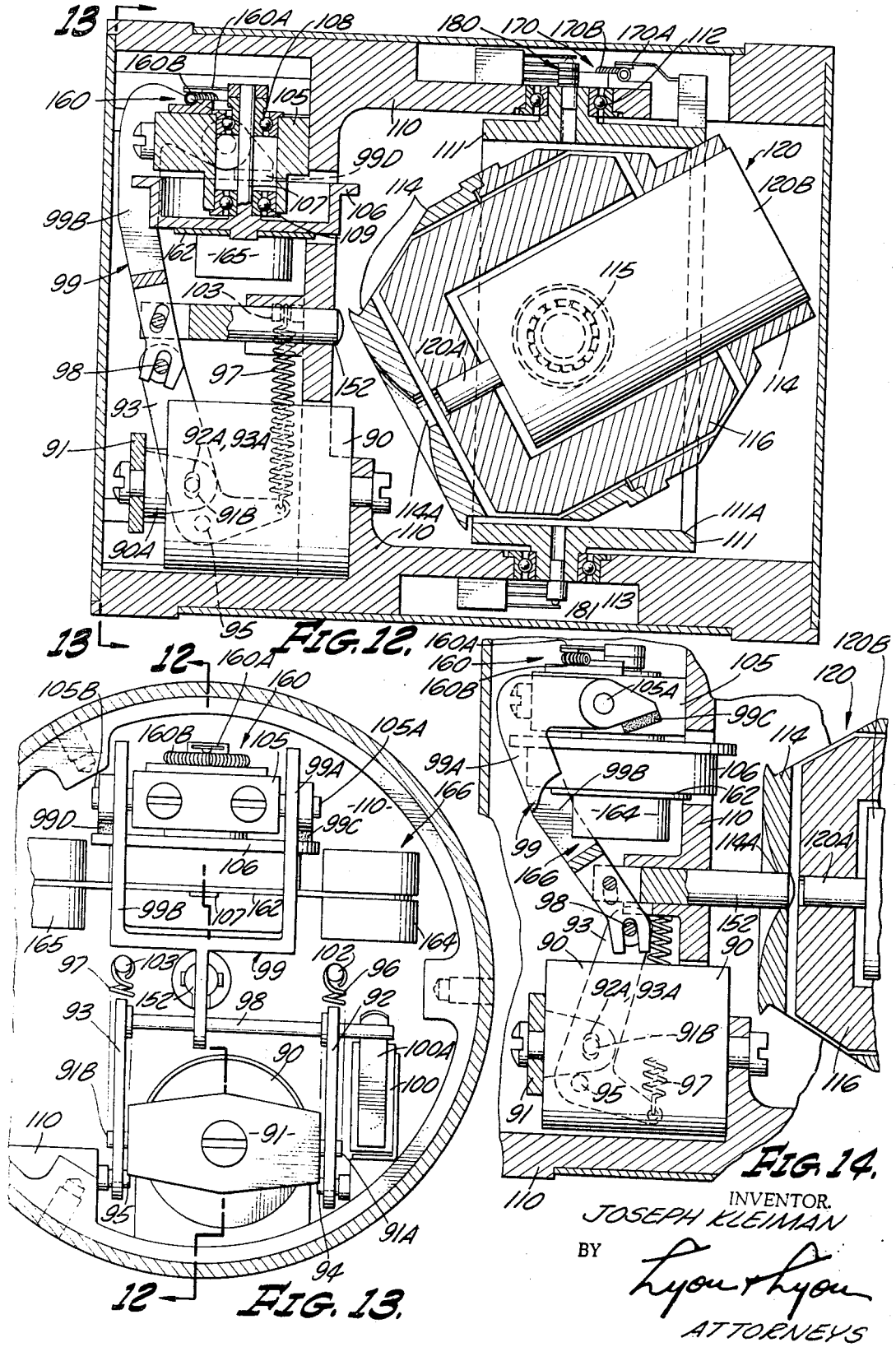

United States Patent Office 3,449,960
Patented June 17, 1969

3,449,960
CORRECTABLE REFERENCES IN GYROS
Joseph Kleiman, Los Angeles, Calif., assignor to Whittaker Corporation, Los Angeles, Calif., a corporation of California
Filed Feb. 3, 1966, Ser. No. 524,881
Int. Cl. G01c 19/04
U.S. Cl. 74—5.4                                           10 Claims

ABSTRACT OF THE DISCLOSURE

A gyro system, during its caged condition, has an element continuously adjusted in accordance with a condition such as, for example, roll of a missile. During uncaging of the gyro system this element is locked to preserve knowledge of roll axis orientation at time of missile launch. This element may be a rotor of a Selsyn which is used for dual purposes, namely as a memory element (phase 1) during the caged condition and later during the uncaged condition when it is locked to one of the gyro gimbals, (phase 2) as an information transmitting element for detection and transmission deviations from a reference point established during the time the element served as a memory element (phase 1). In a modification the memory element may be in the form of a potentiometer type resistance which has its adjustable tap locked to the gyro frame at the time of uncaging.

---

The present invention relates to improvements in gyro control systems.

A general purpose of the present invention is to permit continuous modification of a gyro such as its control angle until a final decision is made at which time the control position previously modified is "frozen."

Thus, for example, in a missile system wherein a gyro is used to establish an angular reference, such as a roll reference, and more particularly, in an application where the roll condition of the missile at time of launch is subject to variation (such conditions as exit when missiles are launched from moving platforms such as naval vessels or aircraft), means are provided in accordance with the present invention which permits injecting and storing a continuously changing reference, which preserves knowledge of the roll axis orientation with respect to an external environment such as inertial space.

An object of the present invention is to provide a system of this character which avoids the necessity of the use of a separate device as in the prior art which stored the required information and which involved a comparison of the position of this separate storage device with the position of the control axis of the gyro. Thus, one aspect of the present invention is that it requires less components than heretofore and further, allows the use of a less complex system with fewer sources of error.

Another aspect of the present invention involves the fact that a dynamic storage element forms a component part of the gyro whereby a less complex over-all system results with attendant advantages in simplicity, lower cost and higher accuracy.

Another aspect of the present invention involves the incorporation in a gyro system of an element which has the capability of functioning both as an input element and an output element during two phases of operation, namely, during a first storage phase and a second control phase. During the storage phase, such element acts as a receiver of a Selsyn type system of dynamically positioning a portion of itself in compliance with an externally connected source of information. Upon receipt of an external command, the moving element is locked with reference to a physical point of reference and from this time forward in the operating cycle (during phase 2) the element becomes a feedback control element permitting detection of any deviation of the control system from the reference point established during the storage cycle (phase 1).

It is therefore a general object of the present invention to provide improved means and techniques for accomplishing the above-indicated features, functions and results.

Another object of the present invention is to provide an improved gyro system.

Another object of the present invention is to provide an improved gyro system in which one of the movable elements thereof is connected to a mechanism that functions as a receiver of a Selsyn system for positioning such movable element prior to uncaging of the gyro and with such mechanism functioning as a control transformer after the gyro has been uncaged.

Another object of the present invention is to provide improved means and techniques involving a gyro construction capable of remembering a particular condition at the time the gyro is uncaged and for subsequently effecting a comparison with such condition during operation of the gyro in its uncaged condition.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is, in general, a transverse sectional view through apparatus embodying features of the present invention, the apparatus being shown in its caged condition and a clutch in disengaged condition;

FIGURE 2 is a view taken as indicated by the lines 2—2 in FIGURE 1 with a portion of a cover member broken away;

FIGURE 3 is a sectional view taken along lines 3—3 of FIGURE 1;

Figure 11:
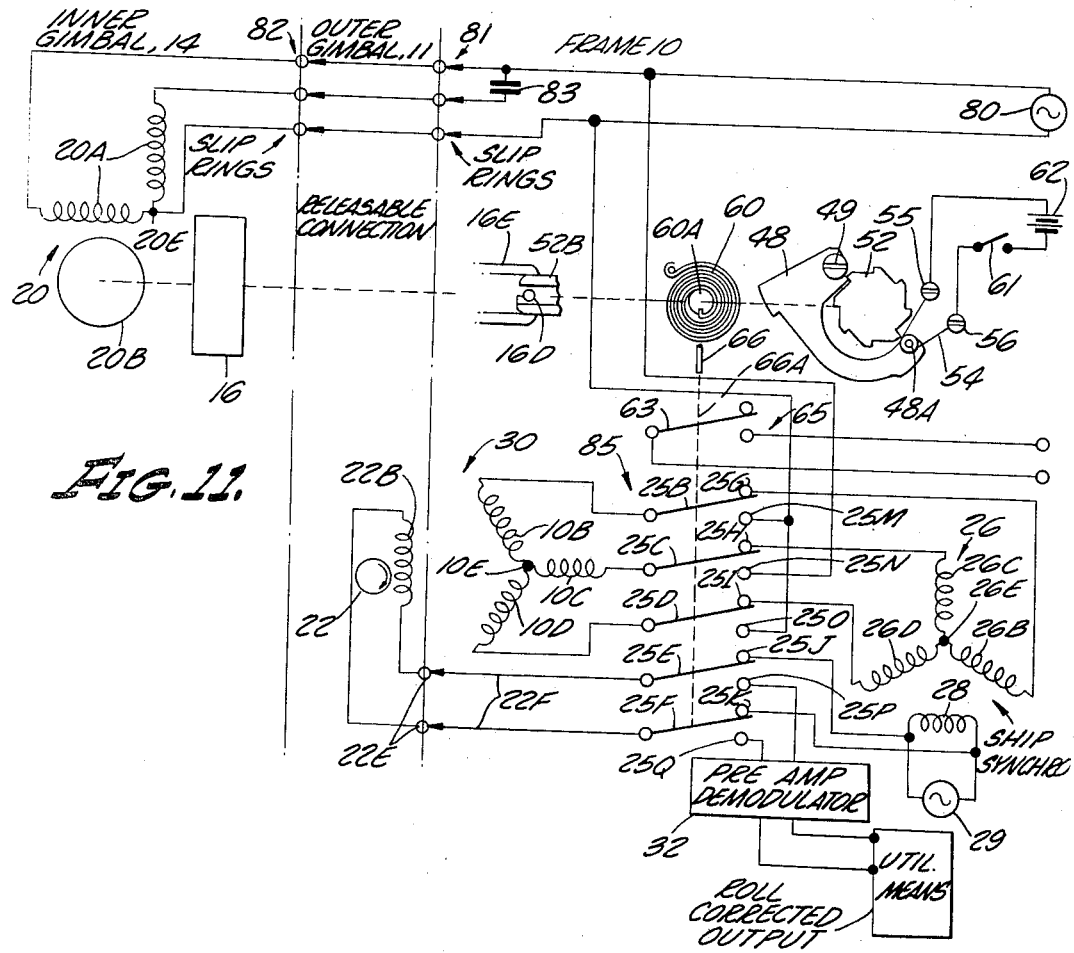
Figure 15:
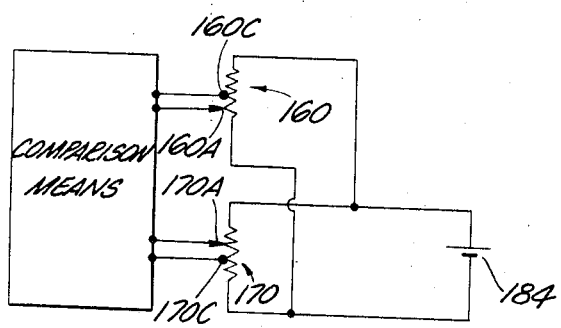

FIGURES 4 and 5 are views taken as indicated by the corresponding lines 4—4 and 5—5 of FIGURE 1 with a portion of covers removed;

FIGURE 6 is a view taken along line 6—6 of FIGURE 1 showing the mechanism latched by a fuse wire;

FIGURE 7 is a view like FIGURE 6 and illustrates corresponding parts in positions they assume after the fuse wire has been broken;

FIGURE 8 is a view like FIGURE 1 with parts shown in their uncaged condition;

FIGURE 9 is a view like FIGURE 1 showing the clutch in the engaged condition;

FIGURE 10 is a view taken substantially as indicated by line 10—10 in FIGURE 6;

FIGURE 11 illustrates in schematic form electrical connections and some of the physical arrangements of apparatus shown in FIGURES 1–10;

FIGURES 12–14 illustrate other apparatus embodying features of the present invention, FIGURE 12 being a section taken along line 12—12 of FIGURE 13, FIGURE 13 being a section taken along line 13—13 of FIGURE 12, and FIGURE 14 being a view like FIGURE 12 but with the gyro in its initial caged condition;

FIGURE 15 illustrates the schematic form electrical connections to some of the apparatus of FIGURES 12–14.

The apparatus shown in FIGURES 1–11 includes a frame 10 rotatably supporting an outer gimbal 11 in bearings 12 and 13. An inner gimbal 14 is rotatably supported on outer gimbal 11 in a pair of aligned bearings 15, one of which is illustrated in FIGURE 3. A rotor 16 comprising rotor halves 16A, 16B and shaft 16C is journalled for rotation in the inner gimbal 14 using bearings 18, 19.

The inner gimbal 14 mounts coils 20A of a gyro sustaining motor 20. The coils 20A cooperate magnetically with the magnetizable structure 20B forming part of the gyro sustaining motor 20, such structure 20B being mounted on the rotor 16.

A portion of the outer gimbal 11 in the form of a sleeve 11A, as seen in FIGURE 1, extends through the bearing 13 and rotatably supports a rotor 22 in spaced bearings 23, 24. Rotor 22 includes a magnetizable structure 22A upon which a single coil 22B (FIGURE 11) is wound. This magnetizable structure 22A cooperates magnetically with a magnetizable structure 10A upon which three coils 10B, 10C and 10D (FIGURE 11) are wound, the magnetizable structure 10A being secured to the frame 10.

In the condition illustrated in the FIGURES 1 and 11 the coils 10B, 10C, 10D and 22B function as part of a Selsyn type receiver. For this purpose the coils 10B, 10C and 10D, as illustrated in FIGURE 11, each has one of its terminals connected at a common junction point 10E and with the other terminal of coils 10B, 10C, 10D connected through a corresponding switch arm 25B, 25C and 25D to a corresponding outside terminal of coils 26B, 26C and 26D of a ship synchro 26. These coils 26B, 26C and 26D each has one of its terminals connected to a common junction point 26E and may comprise the stationary portion of a Selsyn type transmitter, the rotor of which mounts the coil 28 which has its opposite terminals connected to an AC source 29 and also through corresponding switch arms 25E and 25F to corresponding terminals of the winding 22B, using conventional Selsyn type connections for the purpose of causing the rotor 22, upon which the coil 22B is mounted, to repeat the position of the rotor 28 of the ship synchro.

It is observed that at this time that the switch arms 25B–25F comprise the movable arms of a corresponding single pole-double throw switch with the switch arms 25B–25F being in engagement with a corresponding stationary switch contact 25G–25K. In the other position of the switch arms there is an engagement of switch arms 25B–25F with corresponding stationary switch contacts 25M–25Q. For purposes of using the unit 30 (comprising coils 10B, 10C, 10D and 22B) as an output element, i.e., a control transformer, the output of coil 22B is applied through stationary contacts 25P, 25Q to a preamp and demodulator stage 32 for the purposes of providing a roll corrected DC output after the gyro has been uncaged in the manner described below.

The rotor 22 which mounts the coil 22B is engageable with a circular clutch element 36 having a clutch face 36A. This face 36A is maintained spaced from the rotor 22 by a spring-urged latch pin 38 having its upper end in FIGURE 1 engaging a flanged portion of clutch disc 36 and its lower end engaged by a circular head of pin 40. The clutch disc 36 is prevented from rotating with respect to the outer gimbal sleeve 11A by one or more pins 36B on disc 36 extending into and cooperating with the walls of a clutch guide structure 11C threaded on the outer gimbal sleeve 11A. Also the clutch disc 36 has threaded thereon a guide pin 36C which extends through a slightly oversize central opening in sleeve 11A with a prestressed coil compression spring 36D being positioned between an internal shouldered portion of sleeve 11A and the head of pin 36C.

The latch pin 38 is slidably mounted in a frame member 10F (FIGURES 1 and 2) which is secured by bolts 10G to frame 10 and which provides a seat for one end of the coil compression spring 42 having the other one of its ends bearing against a shouldered portion of latch pin 38.

The previously-mentioned pin 40 is slidably mounted in frame 10 and mounts a threaded nut member 44 which serves as an abutment for one end of a prestressed coil compression spring 46 having its other end bearing against an internal shouldered portion of frame 10.

This nut or sleeve member 44 is slidably mounted in the frame 10 and engages an intermediate portion of a cantilever supported leaf spring 47 (FIGURES 1 and 4), the movement of this leaf spring 47 being limited by its engagement with a pivoted pawl member 48, the pawl member 48 being pivotally mounted on a post 49 on a torsion spring housing 50 and being held against the spring-urged ratchet member 52 to prevent its rotation by a U-shaped section of fuse wire 54 which has its ends connected to electrical terminals 55, 56 and an intermediate portion engaging a post 48A on the pawl member 48.

Thus, as long as the fuse wire 54 is intact, the clutch disc 36 is maintained out of engagement with the rotor 22 as shown in FIGURE 1.

When, as described later, a sufficiently high electrical current flows through the fuse wire 54, the fuse wire 54 burns out and the pawl member 48 is then free to move to its position shown in FIGURE 7 by the action of the prestressed ratchet 52. The pawl member 48 becomes latched by its engagement with the end of the cantilever spring 47. During such movement of pawl 48 to its latched position the pawl 48 causes the sleeve 44 to move to the left in FIGURES 1, 4 and 7 against the influence of spring 46 to thereby move the head of pin 40 out of engagement with the latch pin 38 whereby it is then free to move downwardly in FIGURE 1 under the action of spring 42 out of engagement with the clutch disc 36, clutch disc 36 then being free to move into clutch engaging position shown in FIGURE 9 by the action of spring 36D.

This fuse wire 54 is burned out to achieve this above-described clutch engagement at the time the gyro is uncaged using the forces stored in the prestressed torsion spring 60 within housing 50, this spring 60 being that spring which causes the previously-mentioned rotation of ratchet member 52.

As illustrated in FIGURE 11, the previously-mentioned fuse wire 54 is connected in a series circuit with a normally open switch 61 and a DC source 62. When the switch 61 is closed, i.e., at an uncage command the fuse wire 54 melts and the pawl 48 is free to move and during such movement, the arms 25B–25F of the five previously-mentioned single pole-double throw switches as well as the movable arm 63 of an interlock switch 65 are operated by a pin 66 (FIGURE 1) engaged and moved by the expanding torsion clock-type spring 60. This same switch actuating member 66 in FIGURE 1 is illustrated in FIGURE 11 as being connected to the movable switch arms by a mechanical connection represented by dotted line 66A.

The torsion spring 60 is prewound using a turning tool (not shown) inserted in the hexagonal socket portion 52A of the ratchet member 52 which has an outer hexagonal cross-sectional portion 52B slidably mounted in both the spring spindle 60A and aligned socket portion 16E of rotor 16, the inner end of the portion 52B having a slotted curved portion 52C releasably engageable with a pin 16D extending transversely through socket portion 16E.

An arm 48B carried on pawl member 48 normally retains the pawl member 52 in its position shown in FIGURE 1 against the action of the coil prestressed compression spring 72 positioned between pawl member 52 and spring housing 50. To brace pawl member 48 against the force of this spring 72, the pawl member 48 engages the underside of a tongue member 50F struck out of casing 50.

In operation of the arrangement shown in FIGURES 1–11, the assembly is initially armed as shown in FIGURES 1 and 6 in which case the gyro is caged and the torsion spring 60 is maintained in its tight prestressed condition as shown in FIGURES 1 and 6 with one end of the spring 60 engaging its spindle 60A and with the other end of spring 60 engaging casing post 50A; however, the rotor 22 carrying winding 22B is free for positioning by the ship synchro 26 (FIGURE 11), the current for the coil or winding 22B on rotor 22 being conducted through slip rings 22E and conductors 22F (FIG- URES 1 and 11). The rotor 22 continues to be positioned by the ship synchro 26 until such time that it is desired to uncage the gyro in which case switch 61 is closed to supply a heating current for the fuse wire 54 to cause it to melt. After the fuse wire 54 is broken by heating, the force of spring 60 acting on ratchet member 52 is now free to turn the pawl member 48 in the clockwise direction (FIGURE 4) around its pivot 49 to effect a complete disengagement of the pawl and ratchet in which case the released spring spindle 60A causes the rotor 16 to be turned at a high speed at which it is sustained by continued energization of sustaining motor 20, the current for motor 20 being supplied from AC source 80 through a first series of slip rings 81 and a second series of slip rings 82, the slip rings 81 being between the frame 10 and outer gimbal 11 (FIGURES 1, 5, and 11) and the slip rings 82 (FIGURE 11 only) being between the outer gimbal 11 and inner gimbal 14. It will be seen in FIGURE 11 that the pair of windings 20A are connected at a junction point 20E and that the outer terminals of such pair of windings 20A are interconnected by a capacitor 83. The junction point 20E is connected to one terminal of source 80E having its other terminal connected to one of the outside terminals of one of the windings 20A.

During this uncaging operation, as the weighted rotor 16 accelerates and arm 48B moves out of engagement with ratchet member 52, the driving slotted portion 52C moves out of engagment with rotor pin 16D under the influence of spring 72 so that thereafter the rotor 16 is completely uncaged after being subjected to the energy of spring 60. The pawl member 48 thereafter becomes latched by cantilever spring 47 as shown in FIGURE 7. Substantially contemporaneously, the clutch member 36 engages the rotor 22 to lock it to the outer gimbal 11, this being so since, as described previously, the outward movement of element 44 in FIGURE 1 allows downward movement of latch pin 38 whereupon the spring 36D is effective to move clutch disc 36 in engagement with rotor 22.

Thus, as the gyro rotor 16 is uncaged, the rotor 22 with winding 22A is locked to the outer gimbal 11 in a relative position thereto which is determined by prior history in the form of information supplied from the ship synchro 26. This information supplied by the ship synchro 26 may be derived from the ship gyro and may be information as to the roll angle of the ship. In such case the mechanism remembers the roll angle which the ship had at that particular moment of launching and this remembered position is subsequently used as a reference. It is, of course, understood that this information previously supplied and stored as a remembered position in rotor 22 may be information of various types which may be used as a reference with respect to which other information subsequently developed during operation of the gyro is compared. This information in the present description is considered as being roll axis information and is that particular roll angle at the time of launching of a missile carrying this apparatus, such roll angle being compared with other information supplied from the coil 22B, which now, instead of being an input element, is an output element of, for example, a control transformer with the output current now being supplied to a preamplifier and demodulator stage 32 for developing a useful output such as a roll-corrected DC output. In effecting transformation of coil 22B from an input element to an output element, the spring 60 engages and moves the switch actuating member 66 which then causes the group of switches identified by the general reference numeral 85 to assume its other condition wherein the movable switch arms 63 and 25B–25F (FIGURE 11) now engage the other stationary terminal. In this latter case it will be seen that the switch arms 25E and 25F are now connected to contacts 25P and 25Q which are the input terminals for the preamplifier and demodulator stage 32 which develops as an output the previously-mentioned roll-corrected DC output.

The apparatus described may be furnished with two cover members 10L, 10M (FIGURE 1) which are releasably connected to the frame 10 by screws 10P, 10Q.

In FIGURES 12–14 the outer gimbal 111 is rotatably supported in bearings 112, 113 on frame 110. Inner gimbal 114 is rotatably supported on outer gimal 111 in a pair of aligned bearings, one of which is illustrated in FIGURE 12. A weighted rotor 116, a part of gyro sustaining motor 120, is secured to the shaft 120A of such motor 120 having its frame 120B secured to the inner gimbal 114. The inner gimbal 114 is shown in FIGURE 12 in one of its possible extreme conditions wherein it engages a stop on the outer gimbal 111 in the form of a tapered surface 111A thereon.

Initially the inner gimbal 114 is locked to the frame 110 as seen in FIGURE 14 wherein a plunger 152 slidably mounted in frame 110 engages an inner gimbal apertured portion 114A from which such plunger 152 may be withdrawn on an uncage command.

It is noted that in the condition shown in FIGURE 14, rotation of both the inner and outer gimbals is prevented, the inner gimbal 114 being directly locked and the outer gimbal 111 being indirectly locked.

An uncage command is effected by deenergizing a solenoid structure 90 mounted on frame 110. Solenoid 90 has its movable armature 90A (FIGURE 12) connected to an intermedate portion of a U-shaped strap 91, the ends of strap 91 carrying a pair of pins 91A and 91B engaging side walls of a corresponding slot 92A, 93A in a pair of L-shaped arms 92, 93 each of which has an intermediate portion thereof pivoted on corresponding posts 94, 95 on frame 110 with one of the ends of such arms 92, 93 being attached to one end of a corresponding coil tension spring 96, 97 and with the other one of the ends of such arms 92, 93 being joined by a transverse rod 98 for operating a yoke structure 99 to which the previously-mentioned locking pin 152 is pin connected and for engaging and operating the actuating element 100A of a switch 100 used for the purposes of indicating the caged or uncaged condition of the gyro. The other ends of each of the springs 96, 97 are attached to posts 102, 103 on frame 110.

The parallel extending leg portions 99A, 99B of yoke 99 are pivoted on a support or bracket member 105 affixed to frame 110. The ends of these leg portions 99A, 99B each have welded thereto a clutch shoe 99C, 99D engageable with an annular flange or friction plate of a rotatable cup-shaped clutch member 106 having a shaft 107 rotatably supported in spaced bearings 108, 109 on bracket member 105 and also such shaft 107 carries the wiper arm 160A of a potentiometer 160 having its circular resistance strip 160B stationairly secured to the bracket 105 on frame 110.

A bar 162 having its intermediate portion secured to cup-shaped element 106 mounts two elements 164, 165 of different weights at its ends to provide a pendulum structure 166 whose purpose is to position the potentiometer wiper arm in the caked condition (FIGURE 14) of the gyro.

When the gyro is uncaged by deenergizing solenoid 90, the arms 92, 93 move counterclockwise (FIGURES 12 and 14) about aligned pivot posts 94, 95 under the influence of springs 96, 97 to thereby withdraw the pin 152 from inner gimbal apertured portion 114A and thereby uncage the gyro and also to pivot the yoke member 99 in a clockwise direction (FIGURES 12 and 14) about aligned posts 105A, 105B to thereby cause the clutch shoes 99C, 99D to engage and lock the pendulum structure 166 involving weights 164, 165 against any further movement relative to frame 110.

The position of the pendulum structure 166 at the time of uncaging of the gyro is thus remembered in terms of the setting of the wiper arm 160A of potentiometer 160. Thereafter the position of wiper arm 160A may be compared electrically (as indicated in FIGURE 15) with the position of a wiper arm 170A which is movable with the outer gimbal 111 and which engages the circular resistance strip 170B of potentiometer 170 mounted on frame 110.

Slip rings 180, 181 may be used to conduct current to the gyro sustaining motor 120, not unlike the manner indicated in connection with FIGURE 11.

For these purposes the position of the taps 160A, 170A each represent the same quantity since these taps are rotatable about parallel axes. The quantity represented is pitch with the potentiometer 160 providing a reference or memory of pitch condition existing at launch of the missile on which the structure of FIGURES 12–14 is mounted and with the position of the wiper 170A being representative of an instantaneous condition existing after uncaging of the gyro. For effecting a comparison, the potentiometer strips 160B, 170B may be connected as illustrated in FIGURES 15 to a same DC source 184 and in parallel therewith. The voltages appearing at the center taps 160C, 170C and wiper arms 160A and 170A may be used for the desired comparison purposes.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. In a gyro system, a frame; an outer gimbal rotatably mounted on said frame about a first axis; an inner gimbal rotatably mounted on said outer gimbal about a second axis; said second axis being perpendicular to said first axis; means preventing rotation of both said outer and inner gimbals with respect to said frame; a condition responsive element movably mounted on said frame to a position relative to said frame in response to a condition; means for continuously adjusting the position of said element in response to said condition; and common means effective upon operation for disabling said preventing means to thereby allow said gimbals to rotate and for simultaneously locking said element in a position representative of said condition at the time of operation of said common means; said common means being effective to also disable said continuously adjusting means.

2. A gyro system as set forth in claim 1 in which said element is a passive electrical element having a movable portion continuously positioned in accordance with said condition prior to operation of said common means.

3. In a gyro system, a frame; an outer gimbal rotatably mounted on said frame about a first axis; an inner gimbal rotatably mounted on said outer gimbal about a second axis; said second axis being perpendicular to said first axis; means preventing rotation of both said outer and inner gimbals with respect to said frame; a condition responsive element movably mounted on said frame to a position relative to said frame in response to a condition; and common means effective upon operation for disabling said preventing means to thereby allow said gimbals to rotate and for simultaneously locking said element in a position representative of said condition at the time of operation of said common means, said element being a passive electrical element having a movable portion continuously positioned in accordance with said condition prior to operation of said common means, said passive electrical element being a potentiometer-type resistance.

4. A system as set forth in claim 3 including a second potentiometer-type resistance having a movable element, the last-mentioned movable element being connected to one of said gimbals; and means for comparing the relative conditions of the first and second-mentioned potentiometer type resistances.

5. A gyro system as set forth in claim 1 in which said condition responsive element includes a rotor cooperating magnetically with a stator, said common means upon its operation serving to lock said rotor to one of said gimbals.

6. A system as set forth in claim 1 in which said common means when operated serves to lock said condition responsive element to said frame.

7. A system as set forth in claim 1 in which said common means when operated serves to lock said condition responsive element to one of said gimbals.

8. A system as set forth in claim 6 in which said condition responsive element is positioned in accordance with a pendulum structure mounted on said frame, and said pendulum structure is locked to said frame when said common means is operated.

9. In a gyro system, a frame; an outer gimbal rotatably mounted on said frame about a first axis; an inner gimbal rotatably mounted on said outer gimbal about a second axis; said second axis being perpendicular to said first axis; means preventing rotation of both said outer and inner gimbals with respect to said frame; a condition responsive element movably mounted on said frame to a position relative to said frame in response to a condition; and common means effective upon operation for disabling said preventing means to thereby allow said gimbals to rotate and for simultaneously locking said element in a position representative of said condition at the time of operation of said common means, said common means when operated serving to lock said condition responsive element to one of said gimbals, said condition responsive element incorporating a rotor element and a stator element with one of the two latter-mentioned elements being mounted on said frame and the other of said elements being free to move to position itself in accordance with a condition, said other element being locked to one of said gimbals when said common means is operated and producing an electrical output representative of both its position when said common means is operated, and also representative of the position of said one gimbal after said common means is operated.

10. A system as set forth in claim 9 including a synchro having a rotor and a stator; switching means effective in one position for connecting said synchro stator to the first-mentioned stator and also for connecting said synchro rotor to the first-mentioned rotor, a source of AC connected to said synchro rotor in said first condition of said switching means whereby said rotor, in operated condition of said common means follows movement of said synchro rotor, means operated by said comon means for changing the condition of said switching means from said first condition to a second condition, a source of alternating current connected to the first-mentioned stator in said second condition of said switching means, the said switching means in said second condition being effective to connect the first-mentioned rotor to utilization means responsive to the output of the first-mentioned rotor as the same is being moved by said other gimbal.

References Cited

UNITED STATES PATENTS

| | | | |
|---|---|---|---|
| 2,962,901 | 12/1960 | Shirley | 74—5.1 |
| 3,111,038 | 11/1963 | Lewis et al. | 74—5.1 |
| 3,114,269 | 12/1963 | Mills | 74—5.1 |
| 3,229,532 | 1/1966 | Langley | 74—5.1 |

C. J. HUSAR, Primary Examiner.

U.S. Cl. X.R.

74—5.12